Jan. 16, 1962   L. Y. KERHOAS   3,016,667
MACHINE FOR PACKAGING UNDER THERMOPLASTIC FILM
Filed Jan. 18, 1960   12 Sheets-Sheet 1

INVENTOR:
LUCIEN YVES KERHOAS
By
ATTORNEY

Jan. 16, 1962 L. Y. KERHOAS 3,016,667
MACHINE FOR PACKAGING UNDER THERMOPLASTIC FILM
Filed Jan. 18, 1960 12 Sheets-Sheet 3

INVENTOR:
LUCIEN YVES KERHOAS
By
ATTORNEY

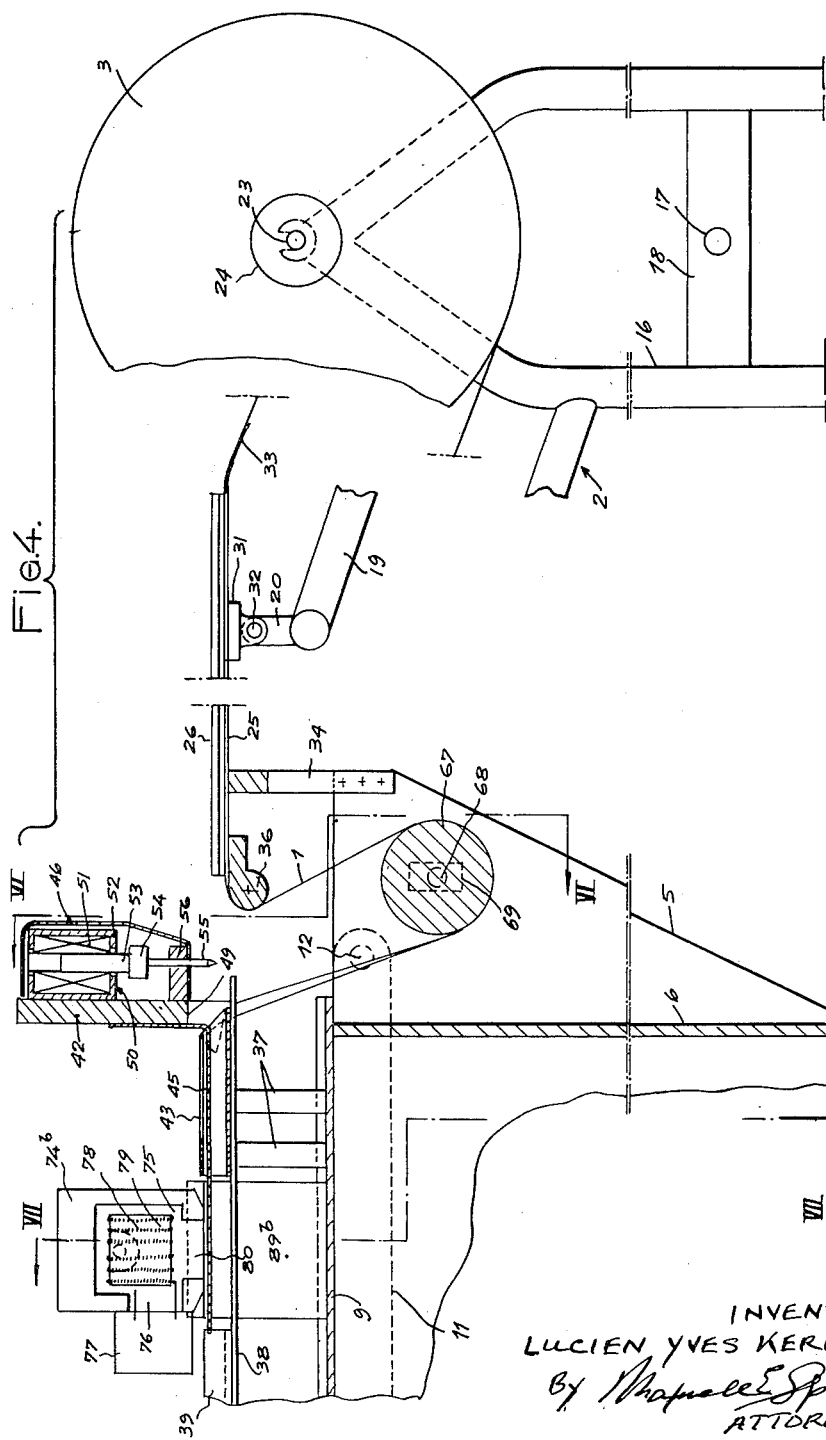

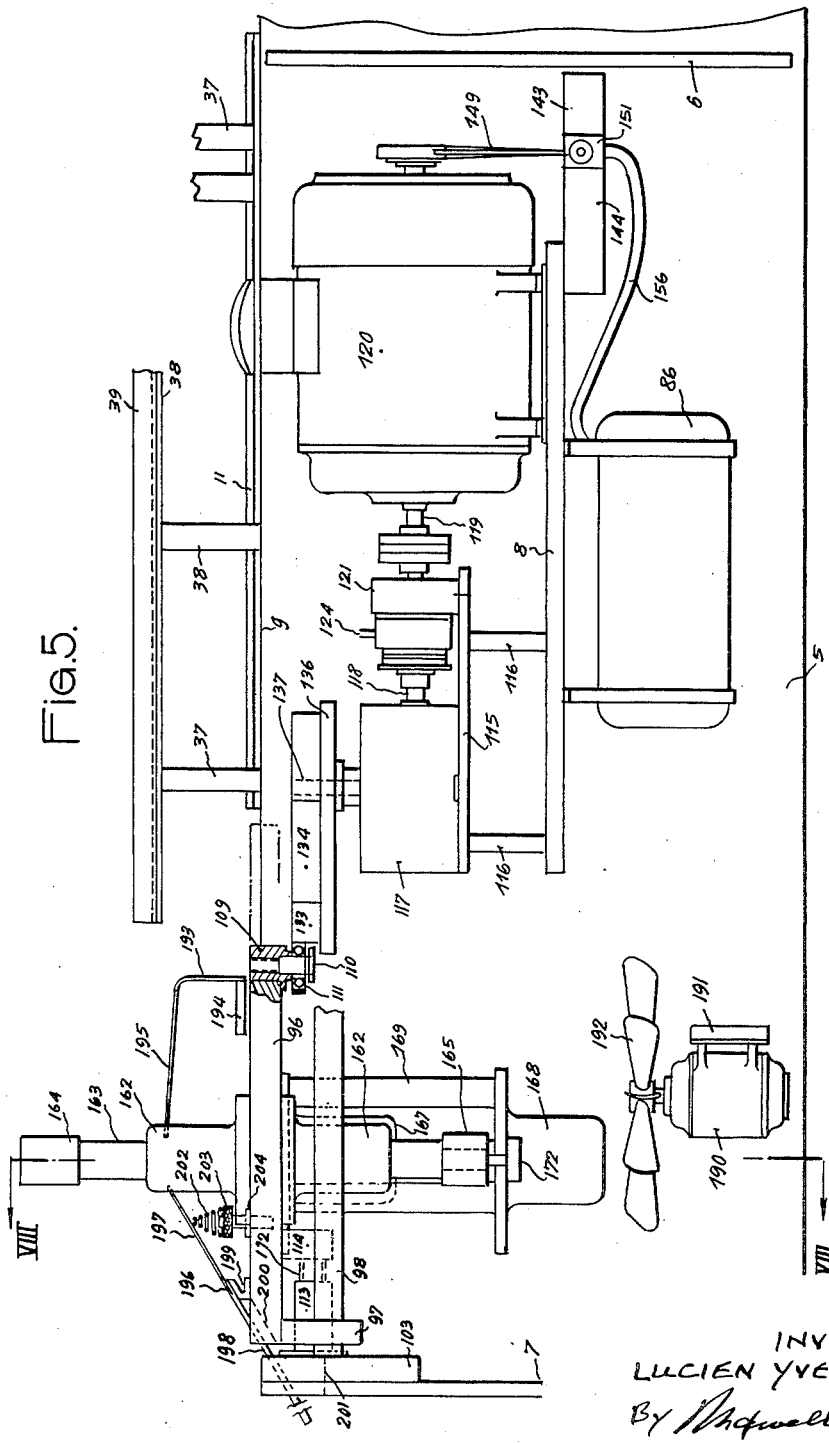

Jan. 16, 1962  L. Y. KERHOAS  3,016,667
MACHINE FOR PACKAGING UNDER THERMOPLASTIC FILM
Filed Jan. 18, 1960  12 Sheets-Sheet 6
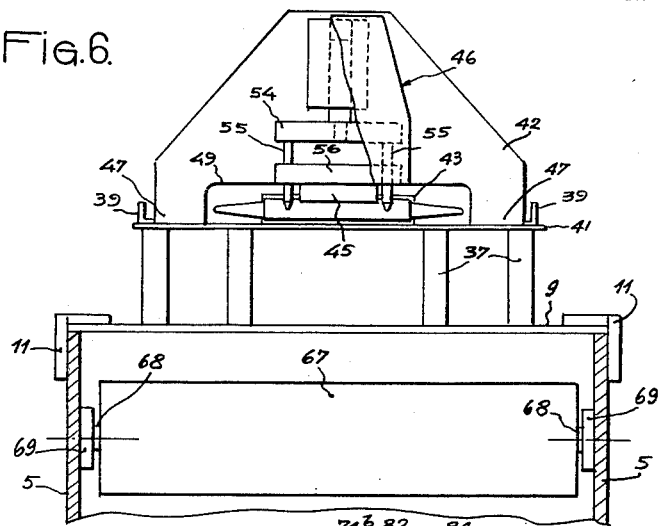
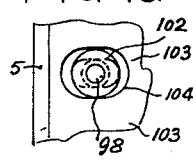
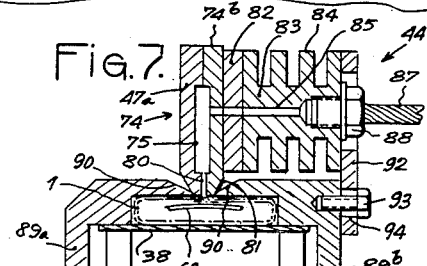
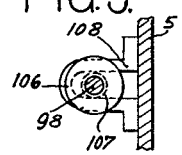
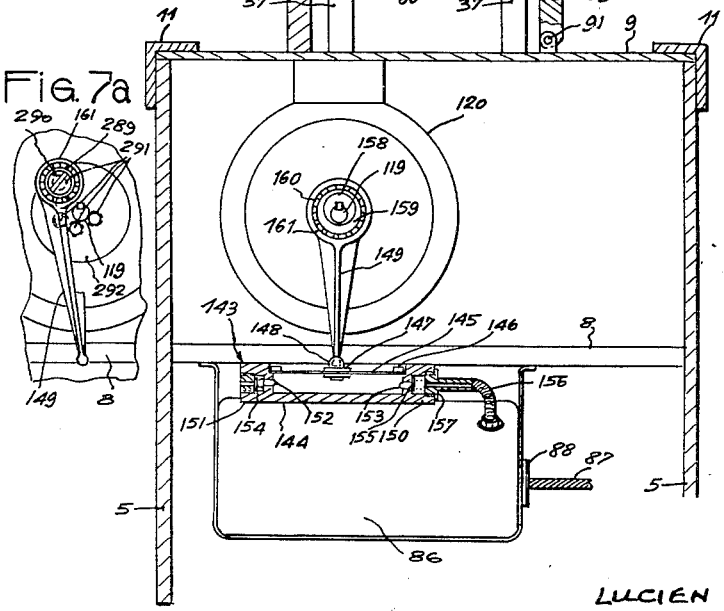
INVENTOR:
LUCIEN YVES KERHOAS
By [signature]
ATTORNEY

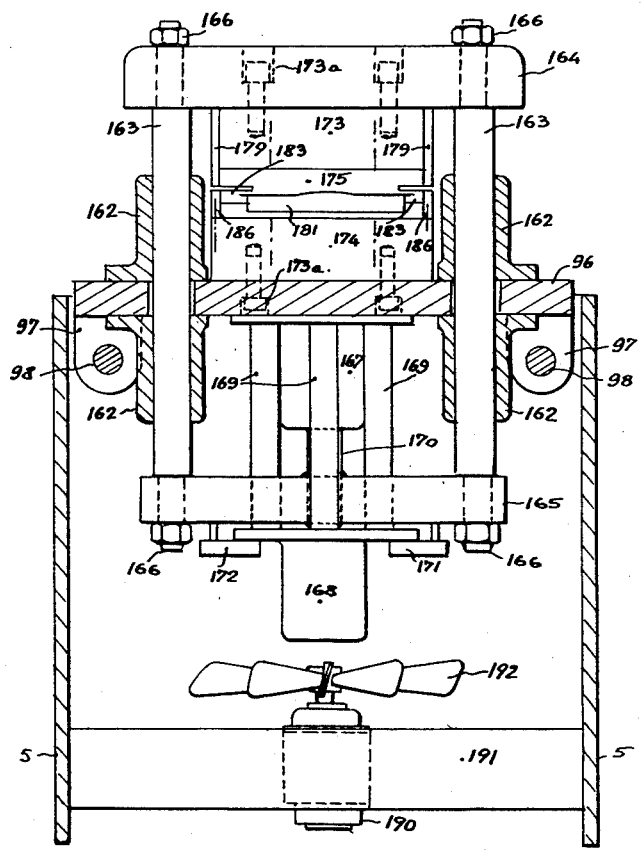
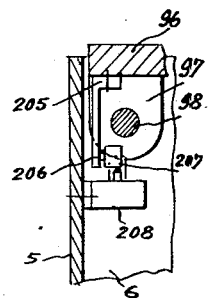
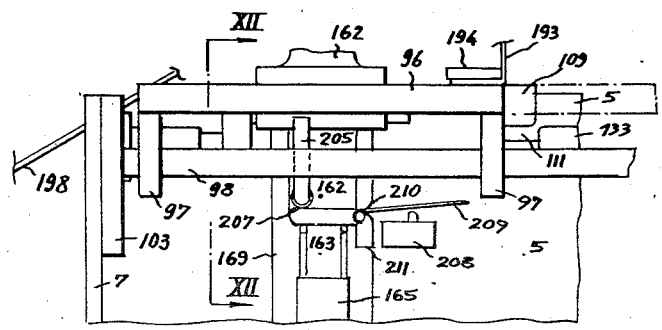

Jan. 16, 1962 L. Y. KERHOAS 3,016,667
MACHINE FOR PACKAGING UNDER THERMOPLASTIC FILM
Filed Jan. 18, 1960 12 Sheets-Sheet 8
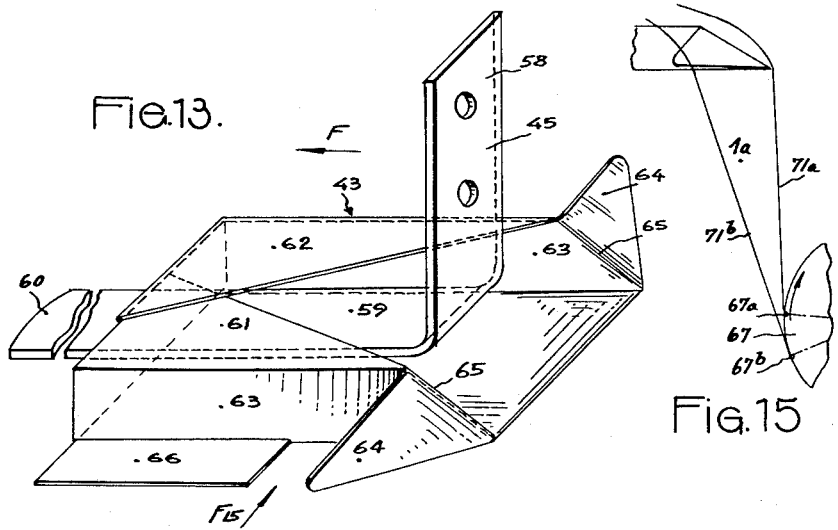
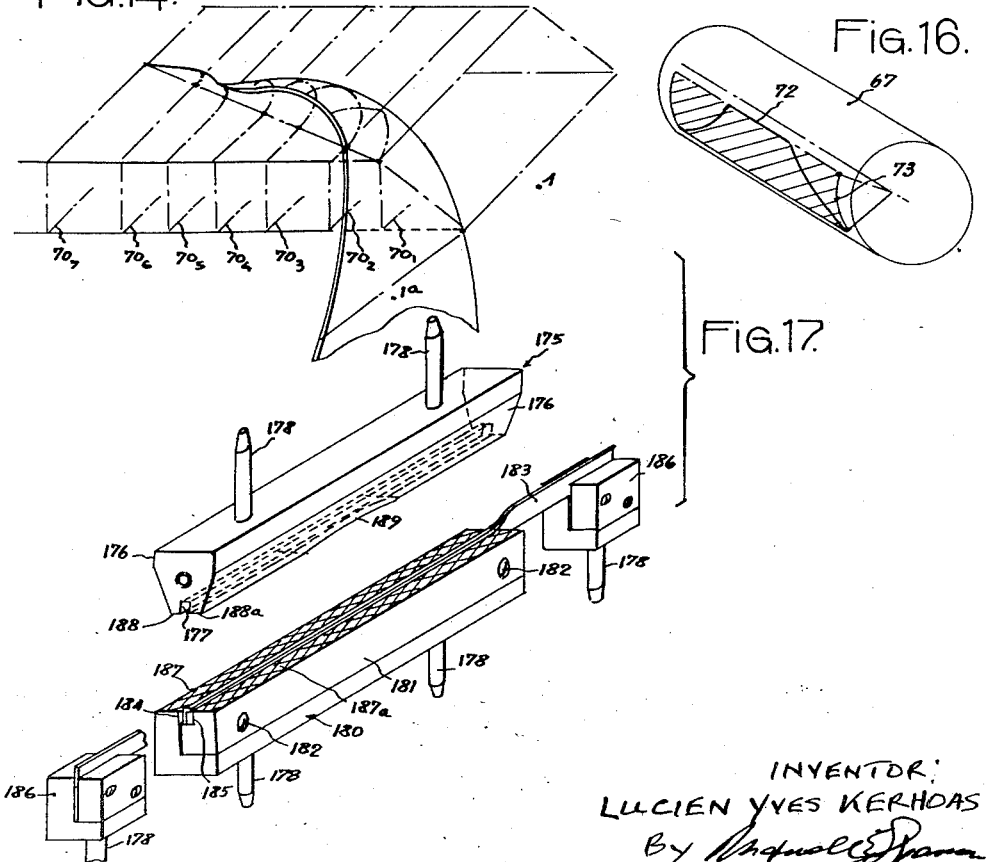
INVENTOR:
LUCIEN YVES KERHOAS Jan. 16, 1962 L. Y. KERHOAS 3,016,667
MACHINE FOR PACKAGING UNDER THERMOPLASTIC FILM
Filed Jan. 18, 1960 12 Sheets-Sheet 9

INVENTOR:
LUCIEN YVES KERHOAS
ATTORNEY

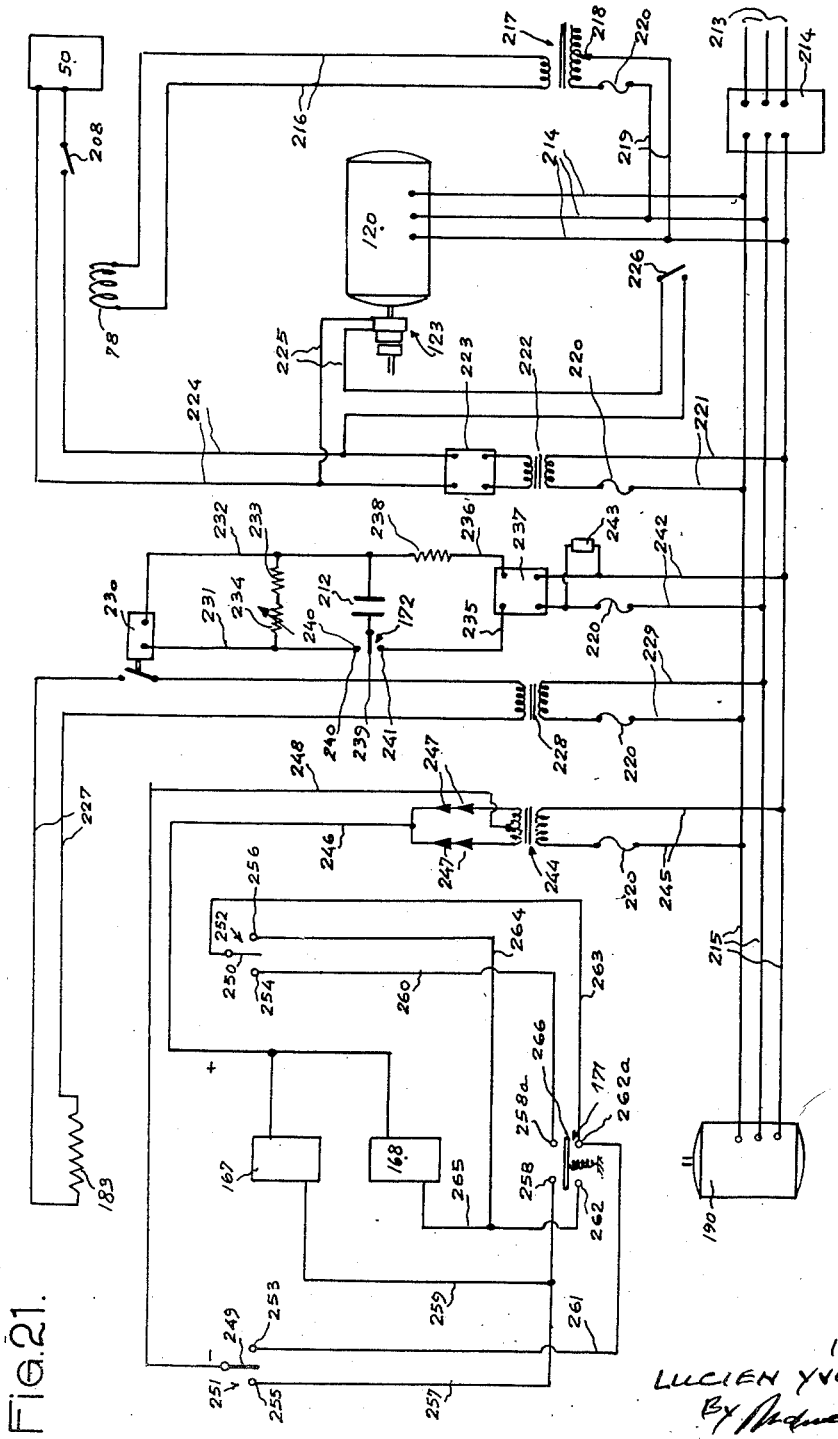

Jan. 16, 1962 L. Y. KERHOAS 3,016,667
MACHINE FOR PACKAGING UNDER THERMOPLASTIC FILM
Filed Jan. 18, 1960 12 Sheets-Sheet 11
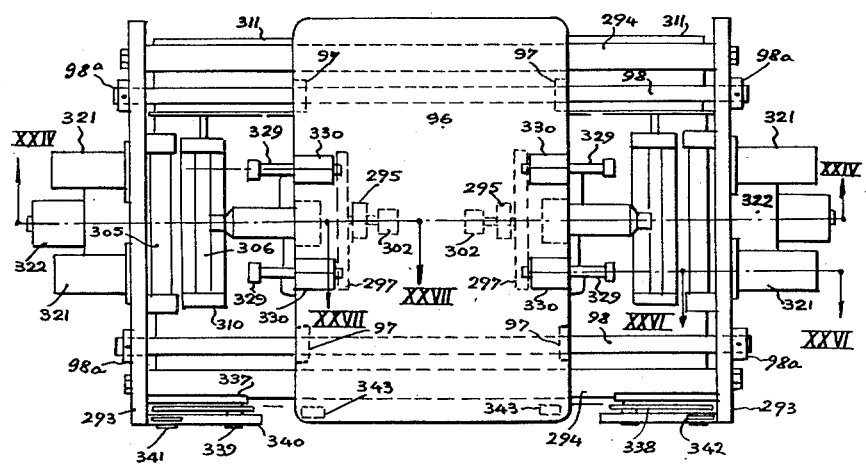
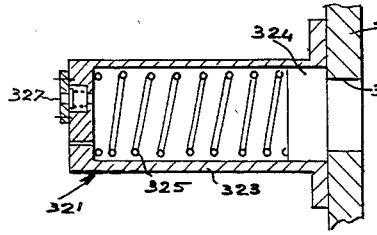
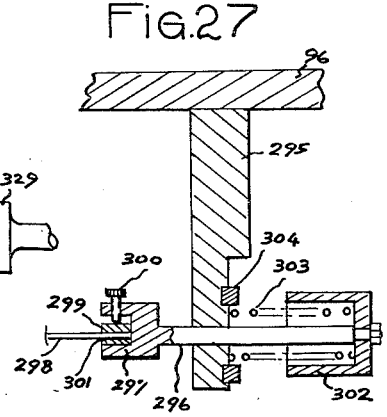
INVENTOR
LUCIEN YVES KERHOAS
ATTORNEY Jan. 16, 1962     L. Y. KERHOAS     3,016,667
MACHINE FOR PACKAGING UNDER THERMOPLASTIC FILM
Filed Jan. 18, 1960     12 Sheets-Sheet 12
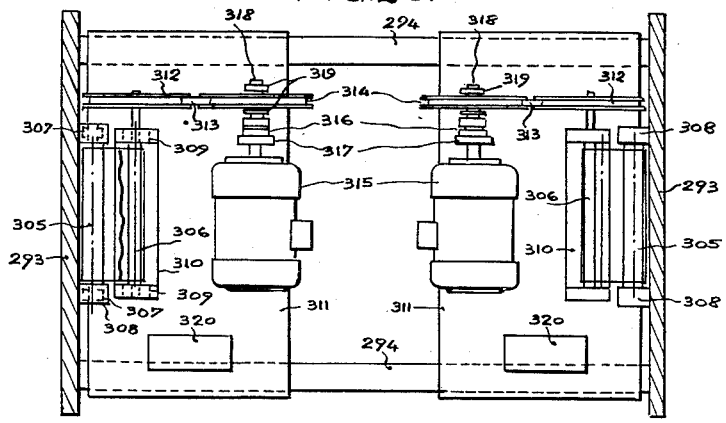
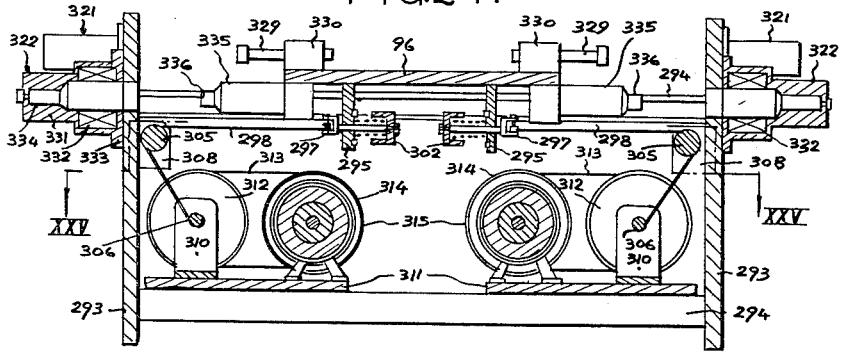
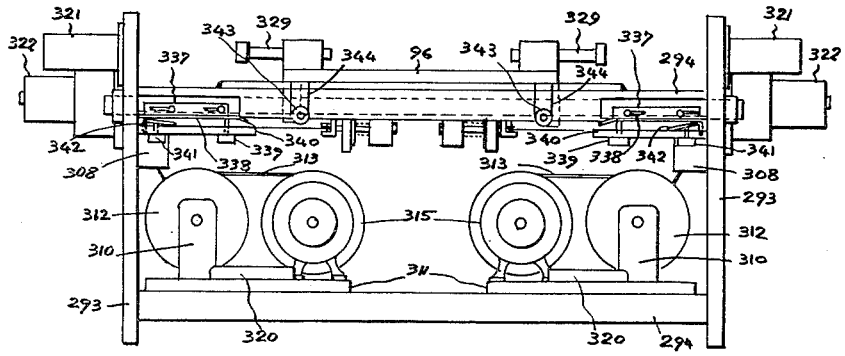
INVENTOR
LUCIEN YVES KERHOAS
ATTORNEY

United States Patent Office 3,016,667
Patented Jan. 16, 1962

3,016,667
MACHINE FOR PACKAGING UNDER
THERMOPLASTIC FILM
Lucien Yves Kerhoas, 26 Rue Charles de Gaulle,
Orsay, France
Filed Jan. 18, 1960, Ser. No. 3,156
Claims priority, application France Jan. 22, 1959
6 Claims. (Cl. 53—182)

The invention relates to an automatic machine for packaging under thermoplastic film, enabling objects to be wrapped in watertight plastic covers having a good appearance and at a very high production rate.

According to the invention, the machine consists of an unwinding device for flat thermoplastic film, by a shaping device for this film according to a tube whose section corresponds to a master-frame for the objects to be packaged, a unit for the longitudinal soldering of this tube, a driving mechanism and periodical depositing of objects in the tube, a guiding runway for the film and plastic tube which is driven by a cyclic motive mechanism supporting a timed and synchronized transversal section-soldering device.

Various other characteristics of the invention will moreover be revealed by the detailed description which follows.

Forms of embodiment of the invention are shown by way of examples in the attached drawings.

FIGURE 4 is a longitudinal section taken along the line IV—IV of FIGURE 3.

FIGURE 5 is a longitudinal section taken along the line V—V of FIGURE 2.

FIGURE 6 is a partial longitudinal section taken along the line VI—VI of FIGURE 4.

FIGURE 7 is a cross-section taken along the line VII—VII of FIGURE 4.

FIGURE 7a is a partial section similar to FIGURE 7 of an alternative embodiment of an element of the machine.

FIGURE 8 is a cross-section taken along the line VIII—VIII of FIGURE 5.

FIGURES 9 and 10 are sections taken respectively along the lines IX—IX and X—X of FIGURE 2 showing a detail of the machine.

FIGURE 11 is a partial section taken along the line XI—XI of FIGURE 2.

FIGURE 12 is a section taken along the line XII—XII of FIGURE 11.

FIGURE 13 is a perspective of the former of the thermoplastic packaging tube.

FIGURE 14 is a working drawing showing the evolution of shaping in the former shown in FIGURE 13.

FIGURE 15 is a lateral elevation taken along the arrow $F_{15}$ of FIGURE 13.

FIGURE 16 is a perspective of the pre-shaping cylinder on which the tangency points are marked of the longitudinal fibres of the thermoplastic film.

FIGURE 17 is a perspective of the impulse sealing-cutting device of the machine.

FIGURE 21 is a diagrammatical view of the electric wiring plan of the machine.

FIGURE 22 is a flat view of an alternative embodiment of the mechanical drive device of the machine.

FIGURE 23 is a lateral elevation of this device.

FIGURE 24 is a section taken along the line XXIV—XXIV of FIGURE 22.

FIGURE 25 is a section taken along the line XXV—XXV of FIGURE 24.

FIGURES 26 and 27 are partial sections taken, on a larger scale, along the respective lines XXVI—XXVI and XXVII—XXVII of FIGURE 22.

Figure 1:
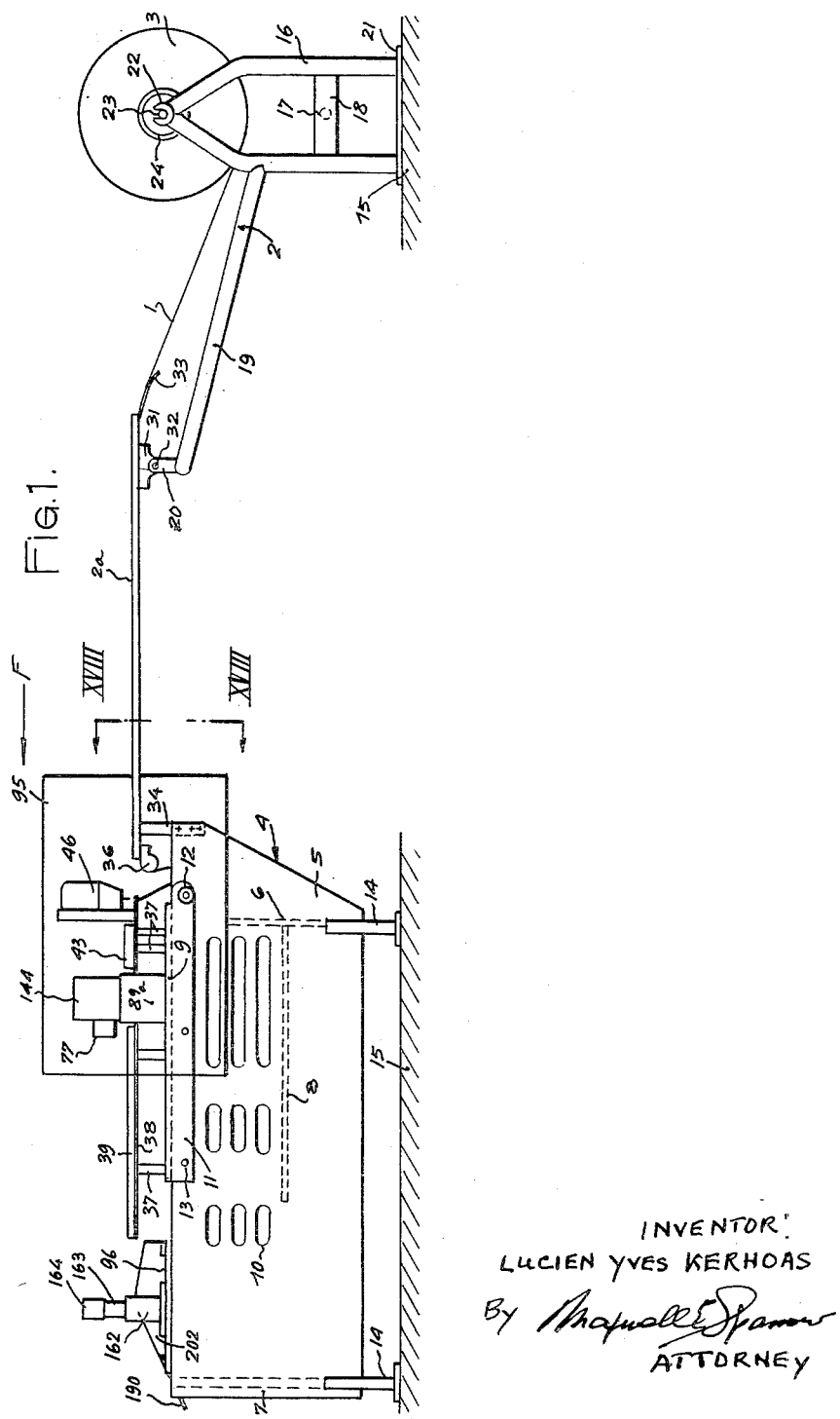
FIGURE 1 is a lateral elevation, on a smaller scale, of an automatic machine according to the invention.

FIGURE 1 shows a lateral elevation of an automatic packaging machine according to the invention. Following the unwinding direction F of the thermoplastic film 1, and consequently the circulation of the articles to be packaged, the machine comprises a spool 3 unwinding device 2 and a frame 4 for the machine itself, connected to this device by a sliding runway 2a.

The frame 4 consists of two lateral cheeks 5 transversally connected by two end plates 6 and 7 to support a tray 8 half way up and at the top, an apron 9. The lateral cheeks 5 and end plates 6 and 7 have numerous lengthened apertures 10 enabling the free circulation of cooling air.

The cheeks 5, the end plates 6, 7 and the tray 8 are assembled by means of shear rods and countersunk-head screws (not shown). The apron 9 is integral with angle-irons 11 hinged on the cheeks 5 by means of pins 12, and secured on these cheeks by bolts 13. This method of construction enables the apron 9 to be pivoted when the bolts 13 are removed in order to give easier access to the members supported by the tray 8 and not to disturb the members connected to this apron. Moreover, the cheeks 5 are integral with legs 14 fitted or fixed on a rigid support 15.

In the example shown in FIGURES 1 and 4, the unwinding device 2 consists of a tubular frame comprising legs 16 transversally connected by means, on the one hand, of a brace tube 17 fixed on flat plates 18 integral with the legs 16, and on the other, a U-shaped support tube 19 and on the middle arm to which lugs 20 are soldered. Each leg is integral at its lower part with a securing plate 21 and at its upper part with a ring 22 forming the end journals 23 of the hub 24 of the spool 3. The rings 22 are split to enable the vertical removal of an empty spool or the introducing of a fresh one.

Figure 18:
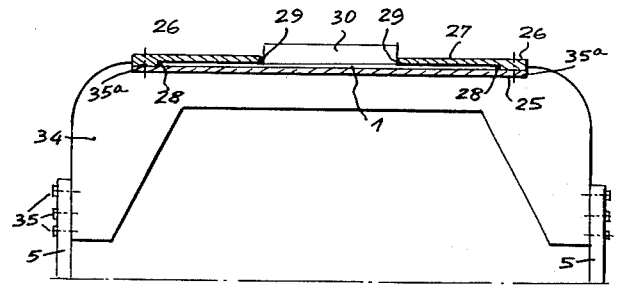
FIGURE 18 is a partial cross-section taken along the line XVIII—XVIII of FIGURE 1.

As can be particularly seen in FIGURE 18, the slide runway 2a is formed of a plate 25 and counter-plates 26 fixed as a border and so shaped as to provide, between them and this plate, a chute 27 for the passage of the thermoplastic film 1. The distance between the ends 28 of this chute appreciably correspond to the width of the film and the distance between the internal edges 29 of these counterplates to the width of the articles 30 to be packaged. The plate 25 of the runway 2a is integral at its lower forward part with bosses 31 (FIGURE 1) intended to be traversed, as well as the lugs 20 of the frame 2, by articulation pins 32, so that the slide runway can pivot around these pins. An incurved guide 33 is brought under the plate 25 for shaping the film 1 coming from the spool 3, and to facilitate its introduction into the runway 2a. Moreover, the plate 25 rests by its free end on a cross-piece 34 fixed by means of bolts on the cheeks 5 of the frame 4 of the machine. The cross-piece 34 has a shoulder 35a on either side of the bearing surface of the plate 25, enabling the latter to be guided transversally, and hence, to align the slide runway 2a with regard to the axis of the machine. Furthermore, the rear end of the plate 25 is integral with a cylindrical guide 36 on which the film 1 (FIGURE 4) slides.

The apron 9 supports, by means of struts 37 (FIGURES 1, 3, 4 and 5), a plate 38 which is rectangular and longitudinally bordered by angle-irons 39 delimiting a chute 40 for the circulation of the soldered tube containing the articles to be packaged (as described farther on).

The plate 38 is prolonged forward by a flared part 41 on to which there are fixed: a support bridge 42, a former 43 and a longitudinal soldering unit 44. The bridge 42 supports (FIGURES 3, 4 and 6), on its forward face, a separator 46, and on its rear face, a slider 45 penetrating into the former 43, to be placed, on emerging from the latter, under the soldering unit 44.

The bridge 42, of trapeze shape, comprises two legs 47 fixed on the part 41 on either side of a cavity 48 made in the latter. These legs delimit an aperture 49 intended to allow the passage of the film 1 in course of shaping. The separator 46 comprises an electro-magnet 50 formed by a coil 51 enveloped by a part 52 fixed on the bridge 42 and by a plunger core 53. The free end of this plunger is integral with a crossbar 54 provided with two needles 55 guided in a part 56 projecting on the bridge 42 and bordering the aperture 49. The needles 55 are rounded at their free ends so as to be able to intercept articles for packaging, without damaging them. The separator thus formed is protected by a casing 57.

The slider 45 (FIGURES 3, 4 and 13) is made of a flat plate bent into a T-iron whose vertical arm 58 is attached to the bridge 42 by any suitable means, and whose horizontal arm comprises a flat part 59 situated inside the former, and an incurved part 60 placed under the soldering unit 44.

The former 43 (FIGURE 13) is obtained from a cut out and bent steel sheet to have the general shape of a parallelepipedic casing open at both ends and whose upper wall is formed by two triangular parts 61, 62 partially overlapping so that their sloping edges form an angle turned backwards. Furthermore, the lateral walls 63 of this casing are bent in a bevel forward to form two wings 64 whose ascending folding line 65 joins up to the sloping edges of the triangular parts 61 and 62. The wings 64, of triangular shape whose summits are rounded, are sloped rearwards. Moreover, the lateral walls 63 of this former are provided with lugs 66 fixed on the flared part 41 of the plate 38.

Figure 3:
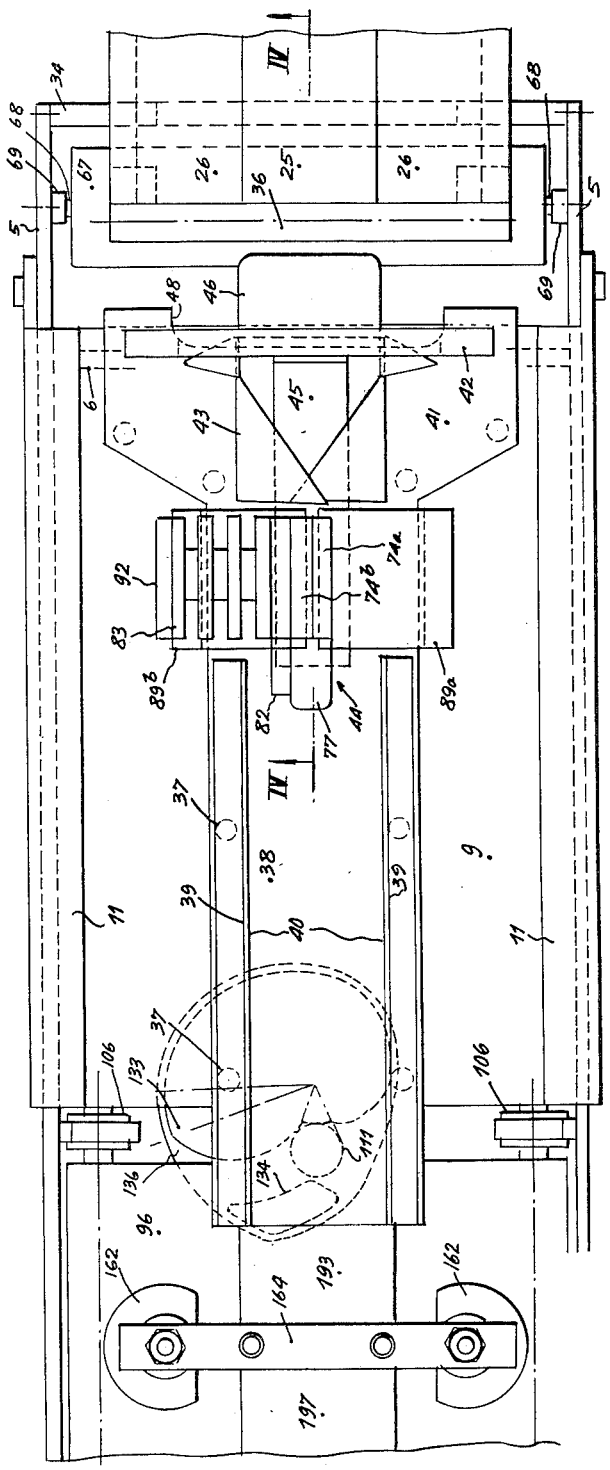
FIGURE 3 is a partial flat view completing FIGURE 2.

The thermoplastic film 1, passing over the cylindrical guide 36 of the sliding runway 2a, is wound on to a drum 67 to form a loop before penetrating into the former 43 (FIGURES 3 and 4). For this purpose, the drum is mounted, by its end journals, in bearings 69 integral with the cheeks 5 of the frame. The drum 67 can be replaced by a fixed drum coated with a film of tetra fluoroethylene or other medium affording a proper sliding of the film 1. In order to prevent this coating from attaching itself to the surface of the fixed drum, the latter may be shaped with annular corrugations which tend decidedly to reduce the contact surface of the film 1 on said drum. Furthermore, the latter, entirely cylindrical, can be replaced by a cylinder portion whose aperture angle corresponds to the maximum arc of contact of the film 1.

As can be particularly seen in FIGURES 14 and 15, the lateral strips 1a of the film 1 are folded rearwards while passing on to the lugs 64 of the former 43. Also, by reaction on the sloping edges of the parts 61 and 62 to the pull exerted on the film 1, the lateral strips 1a pivot around these edges, so that this film 1 takes shape at the exit from the former of a rectangular section tube whose upper edges partially overlap. Various stages of the shaping of the tube are shown diagrammatically in FIGURE 14 by means of straight sections $70_1$ to $70_7$. It is quite obvious that the longitudinal ridges of the plastic tube are shaped against the internal folding lines of the former by the articles to be packaged which, carried along by the film, traverse said former.

To avoid the appearance of folds during the forming of the plastic tube, it is necessary that the mechanical tension of the longitudinal fibres of the film 1 should be uniform, and hence, that the drum 67 (FIGURES 15 and 16) should have a very large diameter. Actually, for penetrating into the former 43, the middle 71a, and end 71b fibres have different slopes, so that their tangency points 67a, 67b are situated on different generatrices of the drum. The place 72 of these points, shown in FIG. 16, gives the idea that the arc 73 of the maximum opening of these places must be at least equal to one quadrant of this drum.

Moreover, the cylindrical guide 36 and the leading edge of the former 43 are separated by a distance so that the articles supported and carried along by the plastic film 1 cannot tip up before penetrating into said former.

The longitudinal soldering unit 44 (FIGURES 3, 4 and 7) comprises a nozzle 74 formed by two half-shells 74a, 74b assembled for delimiting an internal cavity 75 communicating by a lateral opening 76 with a plug-switch 77. A heating resistance 78, connected to this plug-switch, is wound on a flattened ring 79, of asbestos, for example, placed in the cavity 75 so that its opening is situated over a slot 80. This lengthened and calibrated slot is made in the lower bevelled part 81 of the nozzle to emerge above the overlap of the edges of the plastic tube. The nozzle 74 is fixed on a plate 82, supporting the plug-switch 77, and on a bushing 83 provided with cooling fins 84. A hole 85 is axially drilled in the bushing 83, the plate 82 and the nozzle 74, so as to communicate with a compressed air tank 86, suspended under the tray 8 of the frame with the cavity 75 by means of a flexible tube 87 and connections 88. The air contained in the tank 86 forming a buffer, goes into the cavity 75 of the nozzle, traverses the ring 79 to be heated by the resistance 78 and emerges on the edges of the plastic tube through the slot 80. For making a good soldering, the following parameters can be acted on: length and width of slot 80, temperature of the heating resistance 78, delivery and pressure of hot air, the advance of the strip and thickness of the material being imperatively fixed characteristics in order to secure a minimum cost price for packaging.

Blocks 89a and 89b terminated by chamfers 90 are placed on either side of the nozzle 74 in order to localise the heating of the plastic tube for a width appreciably corresponding to that of the longitudinal solder to be made. By means of these chamfers, the excess heat is diffused in the mass of the blocks 89a and 89b, the more easily as the edges of this tube are slightly pinched between the incurved part 60 of the slider 45 and these blocks. The blocks 89a resting on the plate 38 for arranging the passage of the tube 1, is fixed on the apron 9. The block 89b placed symmetrically is hinged on this apron by means of a pin 91. A plate 92, integral with a bushing 83, is fixed by means of screws 93 on the block 89b, these screws being placed in lengthened slots 94 made vertically in this plate. Thus, by vertically moving said plate, the distance can be regulated between the soldering nozzle 74 and the edges of the plastic tube 1. To facilitate the various adjustments, and in particular, the initial positioning of the tube, the soldering unit 44 integral with the block 89b can pivot towards the rear around the articulation pin 91.

So that air currents cannot interfere with the proper working of the soldering unit, a tunnel 95 of transparent material is fixed on the frame 4 (FIGURE 1).

Figure 2:
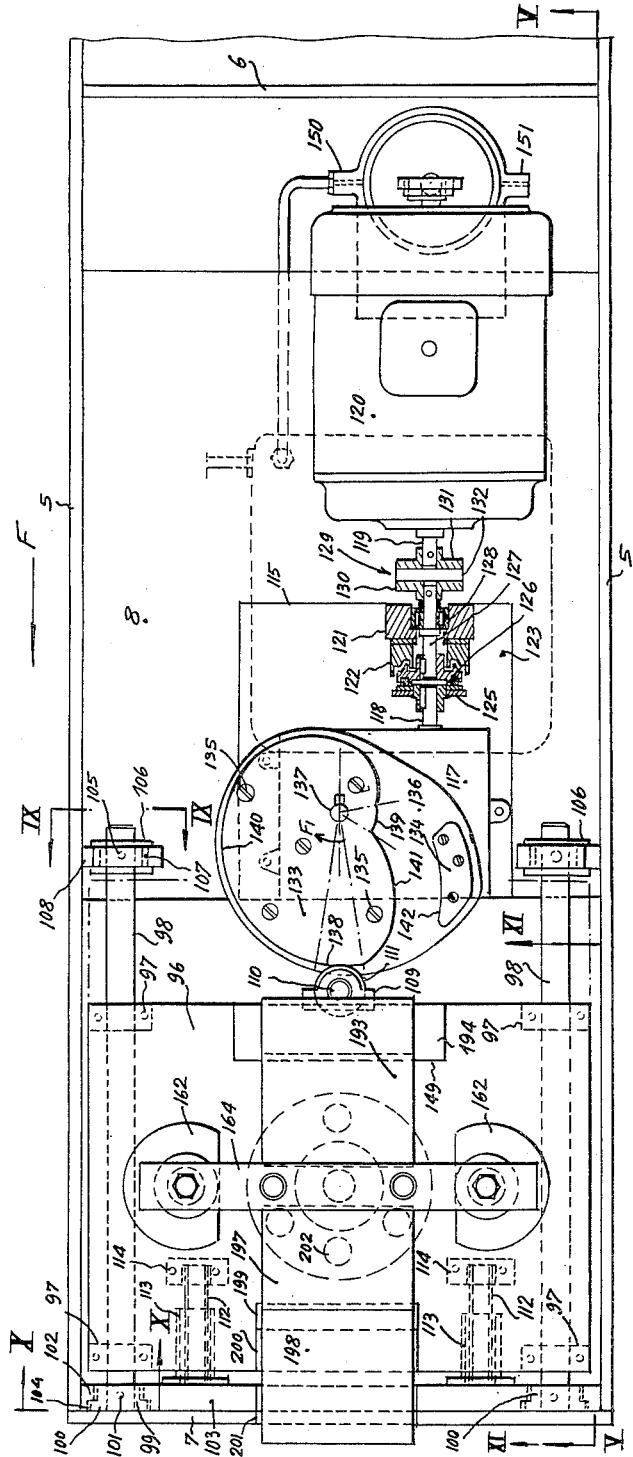
FIGURE 2 is a flat view, partially cut away, of this machine, whose apron is removed.

FIGURES 2 and 5 show in detail the device for moving the thermoplastic tube 1 and the seal-cutting transversally of this tube. This device comprises a carriage 96 provided with rings 97 at its lower part into which cylindrical guides 98 are engaged carried on the frame 4. A ring 99, having a shoulder 100 and fixed by means of a split pin 101 on the rear end of the guides 98, is arranged in a lengthened slot 102 (FIGURE 10) made in a wall-plate 103 integral with the end plate 7, the shoulder 100 of this ring being placed between the ring 7 and the bottom of another slot 104 made concentrically in the slot 102 of the wall-plate 103. The forward end of the guides 98 is made integral by means of a split pin 105 with another ring 106 in which a middle groove 107 is cut (FIGURES 2 and 9). The bottom of this groove is surrounded by a strap 108 fixed on the cheeks 5 of the frame, the walls of this groove being placed on either side of this strap. It follows from the foregoing that the rings 99 and 106 can slide respectively in the slots 102 and in the straps 108 when the guides 98 are shifted by means of the rings 97 under the effect of a dilatation or contraction of the carriage 96.

The carriage 96 carries, against the middle part of its forward edge, a part 109 traversed by a threaded pin 110 holding against the lower face of this part a set of ball bearings 111 whose external race forms a roller.

Furthermore, springs 112, engaged in tubes 113 fixed by means of a base on the wall-plate 103 and in the bushings 114 fixed on the carriage 96, are interposed between this wall-plate and the bottom of the bushing 114 for thrusting the carriage forwards.

A platform 115 connected to the tray 8 is raised by means of struts 116. This platform carries a reducing gear 117, of the meshing type, for example, whose entry shaft 118 is aligned with the shaft 119 of an electric motor 120 which is three-phase. The platform 115 is integral with a cheek 121 supporting the fixed part 122 of an electro-magnetic clutch 123, this fixed part being provided with two supply terminals 124 connected to induction coils revolving in this clutch. The receiving element 125 of the clutch is keyed on to the entry shaft 118 of the reducing gear 117 and the motive element 126 on to a counter-shaft 127 carried by ball bearings 128 suitably mounted in the cheek 121. The free end of the counter-shaft is connected to one end of the shaft 119 of the motor 120 by means of a flexible coupling 129 whose plates 130 and 131 are fixed on these shafts. The flexible member 132 interposed between the plates 130 and 131 is intended flexibly to transmit the torque supplied by the motor, no matter what may be its variations.

A cam 133 and a counter-cam 134 are fixed by screws 135 on a plate 136 made integral, by all suitable means, with the vertical exit shaft 137 of the reducing gear 117. The cam 133, of the bean type, comprises two circular zones 138 and 139 respectively corresponding to the rear and forward positions of the carriage 96 when the roller 111 is in contact with one or other of these zones (FIGURES 2 and 3). These zones are connected by sections 140 and 141 respectively corresponding to a slow advance and a rapid return when the plate 136 revolves in the direction of the arrow F₁. If these sections are spiral whose polar distance is linear function of the angle of the vector radius, the forward and return speeds are uniform. The ratio of these speeds is function of the relative size of the sectors that they occupy on the cam 133. It is quite obvious that these sections 140 and 141 can be plotted to obey a variation law of these speeds corresponding to the cycle chosen for the movement of this carriage. The difference between the radii of the circular zones 138 and 139 determines the magnitude of the travel of the carriage, which travel must be equal to the length of the article to be packaged increased by twice the length of the plastic tube required for closing the packaging by soldering. It transpires from the foregoing that the distance between one of the extreme positions of the carriage 96 and the needles 55 of the separator 46 must be a multiple of the travel determined as previously, that is to say, the length between solderings of a bag containing an article.

The springs 112 thrusting the carriage 96 forward, are not sufficient to effect a continuous application of the roller against the return section 141. These springs only allow the roller 111 to be introduced into the space comprised between this section 141 and a section 142 of the counter-cam 134, said section being equidistant from the section 141 and which cooperates with the latter to cause the rapid return without the necessity of employing said springs.

The tank 86 suspended under the tray 8 of the frame is fed with compressed air by a pump 143 mounted at the free end of the motor 120. This pump comprises a hollow body 144 fixed under the forward end of the tray 8 (FIGURES 2, 5 and 7) and closed, at its upper part, by an elastic diaphragm 145 retained by means of a threaded ring 146. The diaphragm is integral with a central ferrule 147 set on a swivel 148 extending a connecting rod 149. Two bosses 150 and 151 formed as a projection on the body 144, are drilled with holes 152 and 153 controlled respectively by inlet valves 154 and discharge valves 155, of the plate type for example. The inlet valve 154 allows the ambient air to penetrate into the internal cavity of the body 144, when the diaphragm 145 is raised by the connecting rod 149, and the discharge valve 155 establishes communication between this internal cavity and the tank 86 by means of a flexible pipe 156 and a threaded ferrule 157 when said connecting rod 149 thrusts the diaphragm downwards 155.

An off-centered ring 158 is keyed on the free end of the shaft 119 of the motor and a second off-centered ring 159 is keyed on to the former by means of a needle-valve screw, for example. Needles 160 are interposed between the ring 159 and the head 161 of the connecting rod. By revolving the ring 159 on the ring 158, the eccentricity of the head of the connecting rod 161 can be regulated in relation to the shaft 119 and hence the deformation travel of the diaphragm 145.

Guiding bushings 162 (FIGURES 1, 2, 5 and 8) are extended above and below the carriage 96 on either side of the axis of the machine. These bushings are intended to enable two columns 163 to be guided integral with the upper part of a bridge 164 and the lower part of a crossbar 165. The fixing of these columns can be obtained by means of blind nuts 166 screwed on to the turned-over and threaded ends of the latter. Upper 167 and lower 168 electro-magnets are connected by three small columns 169 passing on either side of the crossbar 165, and fixed, by any suitable means, under the carriage 96. A plunger core 170 is thrust into the middle part of the cross-bar 165 so that it also protrudes on both sides of this crossbar. The ends of the core are engaged in the induction coils of electro-magnets 167 and 168, and, when one of them is fed, the corresponding end of the core is sunk, whereas the other end comes out of the other coil. Moreover, a guard reverser 171 of the electro-magnets and a double load switch 172 of a condenser are fixed on the base of the lower electro-magnet 168 so that their operating lever is controlled by the crossbar 165 in the low position.

As shown in FIGURES 8 and 17, a mobile jaw 173 and a fixed jaw 174 are respectively fixed under the bridge 164 and on the carriage 96 by means of hexagonal hollow headed cylindrical screws 173a. A ruler 175 having two chamfers 176 and a groove 177 is fixed in the mobile jaw 173 by means of split pins 178 and lateral lugs 179. An electrode 180 of angle-iron shape is fixed, by means of split pins 178, in the fixed jaw 174. A jaw 181, secured against the vertical wall of the electrode 180 by screws 182, rigidly maintains a resisting tape 183 between several insulating strata 184 and 185. This tape is turned back at its upper part over the entire length of the electrode 180, so that the width of the heating part is much greater at the thick part of this film, this thickness being very slight owing to the resisting characteristics of said tape. The flat ends of the tape are secured in insulating grips 186 where electric current feed conductors end. These grips are fixed, by means of split pins 178, in the fixed jaw 174 so that between the electrode 180 and these grips, the tape forms small loops intended to accentuate their curvature when the tape dilates through heating. The upper lips 187 and 187a of the electrode 180, as well as the lower lips 188 and 188a of the ruler 175 are corrugated in order to prevent the plastic tube from slipping when the carriage 96 advances. Furthermore, a slight notch 189 is made in the middle part of the lips 188 and 188a of the ruler 175 so as not to crush the longitudinal soldering line of the tube when the latter is secured between the jaws. The width of the groove 177 is slightly less than the width of the fold of the tape 183 increased by four times the thickness of the film to be soldered. In this manner, the tape 183, traversed by a current impulse, penetrates into the groove 188 while causing the transversal cutting of the plastic tube by fusion and soldering the edges of this tube by rolling between the tape and the walls of the groove.

An electric motor 190 (FIGURES 5 and 8) fixed on a crossbar 191 connecting the lateral cheeks 5 of the frame, actuates a fan 192 intended to cause the circulation of air in this frame for more particularly cooling the soldering jaws and the members that support them. This cooling can equally well be obtained by means of a forced cold air circulation in the metal masses in contact with the jaws and in the jaws themselves.

A steel leaf 193 (FIGURES 2 and 5), fixed on the forward part of the carriage 96 by means of a flat plate 194, is folded twice to form an upper zone 195 slightly sloping with regard to the horizontal. This zone is intended to support the part of the plastic tube containing the articles for packaging, comprised between the rear end of the plate 38 and the jaws 173, 174 of the carriage 96 in the extreme rear position, this zone being moreover capable of bending for passing under the plate when the carriage makes its return travel.

When a cut has been made, the article packaged falls on to a sloping ramp 196 formed by a flexible part 197 secured in a support plate 198. This plate is fixed on a section 199 attached to the carriage 96, and to enable the passage of said plate, a sloping notch 200 and a cavity 201 are respectively made in the carriage 96 and in the plate 7 and counter-plate 103. The flexibility of the part 197 can be regulated and effected by a tapered helicoidal spring 202 mounted on a milled knob 203 which can be screwed on to a gudgeon-pin 204 locked in the carriage 96.

Under the carriage 96 and close to the forward cheek 5 there is an angle-iron 205 supporting a pivot 206 on which a roller 207 is mounted revolving freely on this pivot (FIGURES 11 and 12). A switch 208, placed on the forward cheek 5, is branched on the feed circuit of the electro-magnet 50 controlling the separator 46. This switch is actuated by a finger 209 hinged on a pin 210 integral with a part 211 attached to the cheek 5, so that the original slope of the finger 209 can be regulated. The finger 209 is actuated by the roller 207 of the carriage, during the end of the return movement and at the beginning of the outward movement of the latter for closing the switch.

The kinematic working of the machine is made up as follows:

A packaged article having been separated by the sealing-cutting of the plastic tube, the various members of the machine are arranged in the following manner: the carriage 96 is at the extreme rear position, the jaws 173 and 174 are brought together, the roller 111 is in contact with the circular part 138 of the cam, the electro-magnetic clutch 123 couples up the electric motor 120 rotatively with the reducing gear 117, the nozzle diffuses hot air for effecting the longitudinal soldering of the tube containing the articles, and the needles 55 of the separator 46 are on the pathway of the articles for packaging.

While the roller 111 remains in contact with the circular part 138 of the cam 133, the upper electro-magnet 167 is energized, which causes the upper jaw 173 to rise. The electro-magnetic clutch 123 being normally fed, the motor 120 is coupled up with the reducing gear 117, and hence the cam 133 revolves at a reduced and uniform speed in the direction of the arrow $F_1$ of FIGURE 2. The springs 112 thrust the carriage 96 in the corridor delimited by the sections 141 and 142 of the cam 133 and counter-cam 134, which causes a rapid return of the carriage while the plastic tube is stopped. Owing to this, the end of the tube containing the last article in the row engages between the two jaws 173 and 174, the more easily as it is held by the upper zone 195 of the steel leaf 193 of the carriage. During this return travel, the roller 207 of this carriage intercepts the finger 209 hinged on to the frame, to close the switch 208 which controls the feed of the electro-magnet 50 of the separator 46, this electro-magnet causing the raising of the needles 55 to free the passage for articles carried along by the plastic film 1 on the sliding runway 2a. The return travel takes place very quickly, and it is not necessary to stop the delivery of hot air to the longitudinal soldering unit 44.

When the roller 111 is in contact with the circular part 139 of the cam 133, the carriage is in the extreme forward position, and as long as it runs on this part 139, it remains motionless to allow time for the jaw 173 to descend under the action of the lower electro-magnet 168 fed. The jaws close on the plastic tube in the space separating the two last articles.

The roller 111 attacks the section 140 of the cam 133, which causes the slow advance of the carriage. During this outward travel, the tube, which is secured between the jaws 173 and 174, advances towards the rear, and hence, the spool 3 unwinds. A length of film equivalent to the length unwound is shaped as previously described in the former 43. The finger 209, during the beginning of the outward travel, is always actuated by the roller 207 of the carriage; the switch 208 remains closed and the needles 55 raised. When the finger 209 is released, the switch 208 is opened; the electro-magnet 50 of the separator 46 is no longer energized and the mobile unit of this separator falls by its own weight to intercept the following article and retain it during the end of the outward travel. This end of the travel must correspond to the distance separating two contiguous articles in the tube for effecting the sealing of the adjacent ends of two contiguous bags.

During this outward travel, the nozzle 75 diffuses hot air which effects the soldering of the two overlapping edges of the plastic tube. Moreover, when the upper jaw 173 descends, the crossbar 165 actuating this jaw furthermore controls the guard reverser 171 of the electro-magnets (as described farther on) and the double switch 172 which enables a condenser 212 (FIGURE 21) to be branched on to a time-lag relay of the feed of the resisting tape 183, and hence, to effect a timed cut-soldering. The tape 83 by passage of the current impulse heats up and by contact causes the melting of the thermoplastic material which is limited on each side of the tape for forming a rolled pad between said tape and the walls of the groove 177 of the ruler 175. When this condenser is discharged, the carriage 96 continues its outward travel to allow time for its jaws to cool, which cooling is speeded up by the fan 192. The roller 111 approaches the circular part 138 of the cam 133, the carriage stops, the upper electro-magnet 167 is energized to cause the raising of the mobile jaw 173 and the article whose packaging is finished falls on to a sloping discharge ramp 196. The guard reverser 171 and the double charge switch 172 are no longer actuated by the crossbar 165 because the jaw 173 is raised. The double switch 172 then connects the condenser 212 with a load circuit described farther on. All the surfaces of the machine, against which the thermoplastic material forming the packaging is in contact, are covered by a thin film of plastic material, such as that known in commerce under the name of "Teflon," or by glass fabric impregnated with the same material. In this way, friction of the film is reduced, and hence the loaded thermoplastic tube. The sticking of the thermoplastic packaging material on these surfaces is also prevented, in a case where the film heats up under the action of the heat diffused by articles which may come, for example, from a pasteurizing chain preceding this machine.

The electric wiring diagram of this machine, shown in FIGURE 21, is set up from a three-phase alternating feed supply source, but this example of embodiment need not be considered as limitative, because this diagram can be easily modified so as to effect the correct working of the machine from any kind of current source. The network 213 is branched on to a general circuit-breaker 214 of the machine, connected by two principal lines 214 and 215 to the motor 120 actuating the carriage and the motor 190 driving the fan. The resistance 78 of the soldering unit can be fed, without inconvenience, by an alternating current whose voltage can be regulated for effecting temperature control. This resistance is connected by two wires 216 to the secondary of a transformer 217 whose primary is branched at one of its ends and at a point 218 adjustable for its winding, by two wires 219 to two of the line conductors 214. A fuze 220 is mounted in series on one of the wires 219.

The feed current of the electro-magnet 50 of the separator and electro-magnetic clutch 123 must be direct. For this, two wires 221, derived on two of the line conductors 215 are branched on the primary of a transformer 222, a fuze 220 controlling this derivation. The secondary of the transformer is branched on a current rectifier 223 which can be, for example, a bridge circuit dry rectifier. It will be easily understood that the transformer 222 is only justified by the characteristics of the electro-magnetic clutch 123 and the electro-magnet 50 which are essentially chosen in relation to their cost price. The two output terminals of this rectifier are connected by wires 224, of which one is controlled by the switch 208 previously mentioned, to the electro-magnet 50 of the separator. Two other wires 225 derived on the wires 224 are connected on the electro-magnetic clutch 123, and to stop the operating of the carriage 96, the jaws 173, 174 and the separator 46, a switch 226 is mounted in series on one of the conductors 225, this switch being connected with the control panel and intended to cut out the feed of the electro-magnetic clutch. If the stoppage of the machine requires to be prolonged, the circuit-breaker 214 is operated, which cuts out the general feed, and in particular that of the motors 120 and 190 and the resistance 78 which is not controlled by the switch 226. The resisting tape 183 is fed, without inconvenience, with alternating current, but its electrical characteristics are such, in this example, that the voltage must be lowered, which is not, however, imperative, for it can be advantageous for other purposes to have direct feed for the tape 183. This latter is connected by two wires 227 to the secondary of a transformer 228 whose primary is branched on two wires 229 derived on two of the line conductors 215, a fuze 220 being mounted in series on one of the wires 229. One of the wires 227 is controlled by a relay 230 mounted on the discharge circuit of the condenser 212. This circuit is formed by two wires 231 and 232, connecting the armatures of the condenser 212 to the terminals of the relay 230, wires between which a fixed resistance 233 and a variable resistance 234 are mounted in derivation. By modifying the magnitude of the variable resistance 234, the time constant can be varied of the discharge circuit of the condenser, and hence, the timing of the relay 230 can be regulated. The load circuit of this condenser 212 is formed by two wires 235 and 236 connecting the armatures of said condenser to the output terminals of a rectifier 237 similar to the rectifier 223. A resistance 238 is mounted in series on the wire 236 to cooperate with the condenser so as to obtain a time constant for the load compatible with the time available on the machine for effecting this load. The load and discharge circuits of the condenser are controlled by the double switch 172 previously described, whose contact 239, connected to one of the armatures of the condenser, is capable of connecting a stud terminating the wire 231, or a stud 241 terminating the wire 235. At the input of the rectifier 237 two wires 242 are branched derived on two line conductors 215, a fuze 220 being mounted in series on one of the wires 242.

243 designates a Neon pilot lamp branched on the wires 242.

In the example shown, the electro-magnets 167 and 168 are respectively fed by a direct current under low voltage. For this, the primary of a transformer 244 with middle plug is connected by wires 245 to two of the conductors 215, a fuze 220 being mounted in series on one of these wires. The ends of the secondary of this transformer are connected up on a wire 246 after passing into rectifying cells 247 of the to-and-fro type. The wire 246, of positive polarity, ends at the input of the windings of the electro-magnets 167 and 168. The middle point of the transformer 244 is connected by a wire 248 to the contact 249 of a double contact unit 251 fixed to the rear on the frame of the machine and capable of being actuated by the carriage, at the end of the rear travel only, so that the contact 249 releases a stud 253 to connect up a second stud 255. Likewise, another double contact unit 252, fixed forward on the frame of the machine, is controlled by the carriage, at the end of the forward travel only, so that its contact 250 releases a stud 254 and connects up a stud 256. The stud 255 is connected by a wire 257 to a stud 258 of the reverser 171 previously described, and by a wire 259, derived on the wire 257, at the output of the winding of the upper electro-magnet 167. The stud 254 is connected by a wire 260 to a second stud 258a of the reverser 171. The stud 253 is connected up by means of a wire 261 to a third stud 262a of the reverser 171, which stud, moreover, terminates at a wire 263 branched on the contact 250. Moreover, the stud 256 is connected up by a wire 264 to a fourth stud 262 of the reverser 171 and by a wire 265 to the output of the winding of the lower electro-magnet 168. The studs 258 and 258a of the reverser are connected up by a contact 266 when the jaw 173 is raised and this contact connects up the studs 262 and 262a of this reverser when said jaw is lowered.

It is quite obvious that the wires 219, 221, 229, 242 and 245 derived on the lines 214 and 215 are branched on the conductors of these lines so that the general network is balanced.

The electrical working of this machine takes place as follows:

As long as the circuit-breaker 214 is connected, the motors 190 of the fan and carriage drive 120 revolve. The separator 46 operates each time the switch 208 is closed at the passage of the carriage 96. The resistance 78 of the longitudinal soldering unit 44 is fed so as to give off a quantity of heat per unit of time adjustable by moving the slide contact 218 of the transformer 217. The electro-magnetic clutch 123 couples up the motor 120 to the reducing gear 117 so long as the switch 226 of the instrument panel is closed.

When the upper jaw 173 is raised, the contact 239 of the switch 172 connects the stud 241 of the load circuit, so that the condenser 212 charges. When this upper jaw descends, it acts on the switch 172 to connect the contact-piece 239 with the stud 240 of the discharge circuit so that, during a given time by regulating the variable resistance 234, the relay 230 closes the feed circuit of the resisting tape 183 which, owing to this, is only fed during this time.

The selective feed of the electro-magnets 167 and 168 takes place as follows: the carriage 96 being at the rear stop and the jaw 173 in the low position, the contact 266 of the reverser 171 connects the studs 262 and 262a, the contact 249 of the double contact-piece 251 intercepts the stud 255, and the contact 250 of the double contact unit 252 intercepts the stud 254. After this, the upper electro-magnet 167 is alone fed because the current coming from the wire 246 can only pass through this electro-magnet, the wires 259 and 257, the stud 255 connected by the contact 249 and the wire 248. Consequently, the mobile jaw 173 slides upwards.

The carriage 96 is still at the rear stop, thus the contacts 249 and 250 are respectively fixed on the studs 255 and 254, but the upper jaw being raised, the contact 266 of the reverser 171 now connects the studs 258 and 258a. It is noticed that the passage of the current takes place along the same pathway thus maintaining the jaw 173 high.

The carriage 96 effects its rapid return travel and the jaw 173 remains high, so that the contact 266 of the reverser 171 still connects the studs 258 and 258a, and the contacts 249 and 250 of the contact units 251 and 252 respectively intercept the studs 253 and 254. It follows that the current, coming from the wire 246, can only pass through the upper electro-magnet 167, the wires 259 and 257, the contact 266 connecting the studs 258 and 258a, the wire 260, the stud 254 connected by the contact 250, the wires 263 and 261, the stud 253 connected by the contact 249 and the wire 248. Consequently, the electro-magnet 167 remains fed and the jaw 173 in the high position.

The carriage 96 reaches the forward stop with the jaw 173 high, so that the contact 266 of the reverser 171 connects the studs 258 and 258a and that the contacts 249 and 250 of the contact units 251 and 252 intercept the studs 253 and 256. The current, coming from the wire 246, can only traverse the lower electro-magnet 168, the wires 265 and 264, the stud 256 connected by the contact 250, the wires 263 and 261, the stud 253 connected by the contact 249 and the wire 248. This lower electro-magnet 168 being fed, the mobile jaw 173 descends.

In this new position, i.e. the carriage 96 at the forward stop and the jaw 173 low, the contact 266 of the reverser 171 connects the studs 262 and 262a and the contacts 249 and 250 of the contact units 251 and 252 respectively intercept the studs 253 and 256. Then, the current coming from the wire 246 can only traverse the lower electro-magnet 168, the wire 265, part of the wire 264, the contact 266 connecting the studs 262 and 262a, the wire 261, the stud 253 connected by the contact 249 and the wire 248. Thus, the lower electro-magnet remains fed and the mobile jaw 173 in the low position.

The carriage 96 now makes the slow outward travel with the jaw 173 in the low position, so that the contact 256 of the reverser 171 connects the studs 262 and 262a and the contacts 249 and 250 of the contact units 251 and 252 respectively intercept the studs 253 and 254.

It is noticed that the passage pathway of the current is not altered and that, the electro-magnet 168 remaining fed, the mobile jaw 173 is maintained in the low position.

In the particular case where the articles to be packaged are boxes whose lids risk catching on each other, the separator cannot unhook them, and there is thus the risk of damaging the tape 183 of the transversal soldering jaws. To obviate this disadvantage, it may be advantageous to have a safety member available close to this separator, controlling the stopping of the whole line of articles, so as to give time to a supervisor to remove the two articles caught together, for it is preferable to lose a certain length of plastic tube rather than to stop the machine whose running is stabilized.

It is quite obvious that the control of the feed circuit of the electro-magnet 50 of the separator, provided for mechanically in the example shown, can be replaced by any other means, such as a photo-electric control, drive by cam, clock work mechanism, etc. Moreover, in the particular case where the articles to be packaged are not very rigid, it would be advantageous to replace this separator by a continuous chain placed above the sliding runway 2a and carrying, at regular spaces apart, divisions for taking the articles stored, separate them and accompany them or convey them to the former 43. Consequently, the articles placed on the film 1 are kept a suitable distance apart from each other, fixed by the divisions on the chain. The separator can also be replaced by any equivalent device, such as a trap synchronized with the movement of the carriage, a gripping arm, etc.

Figure 19:
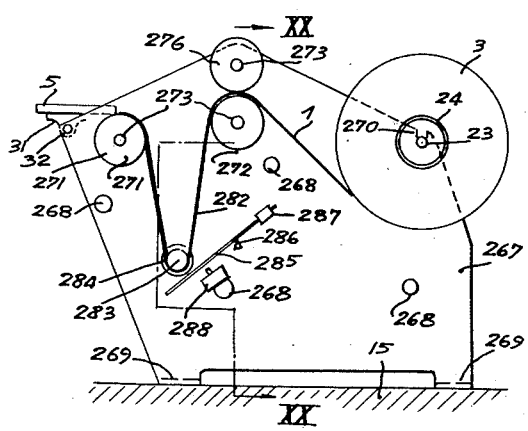
FIGURE 19 is a partial longitudinal section taken along the line XIX—XIX of FIGURE 20, showing an alternative embodiment of a uniform mechanical tension coil unwinding device.
Figure 20:
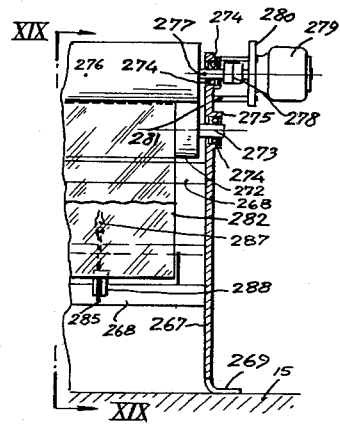
FIGURE 20 is a section taken along the line XX—XX of FIGURE 19.

FIGURES 19 and 20 show an alternative embodiment of the device 2 for unwinding the spool 3 which ensures a uniform tension of the film 1. This device comprises a frame formed by two cheeks 267 connected by strutting tubes 268. These cheeks are cut out of sheet iron bent at the lower part to form lugs 269 for fixing on to the support 15. To lighten this frame, the cheeks 267 can be perforated at suitable spots.

The journals 23 of the hub 24 of the spool 3 are engaged in slots 270 in the cheeks, and the bosses 31 of the sliding runway 2a are traversed by articulation pin 32 previously passed through the cheeks 267. Two smooth metal rollers 271 and 272 are supported, by means of their end journals 273, by ball bearings 274 mounted in the bosses 275 attached to and welded to the exterior of the cheeks 267, so that these rollers can revolve freely in relation to the frame. Above the roller 272, is a driving roller 276 covered with an adherent elastic material, such as rubber, and the play existing between these two rollers is slightly less than the thickness of the film 1 to be conveyed. One of the end journals 273 of the driving roller 276 is mounted on the corresponding cheek like the journals of the rollers 271 and 272. The other journal 277 of this driving roller, suppported by ball bearings 274, is integral with one of the plates of a flexible coupling 278 whose other plate is keyed to the output shaft of a motor-reducing unit 279. The latter is fixed by the end to a plate 280 extended, by means of struts 281, on the corresponding cheek 267 of the frame.

The thermoplastic film 1 is engaged between the smooth roller 272 and the driving roller 276, then passes on to the smooth roller 271 placed tangentially to the sliding runway 2a and in the corridor 27. This film forms a loop 282, between the two smooth rollers 271 and 272 intended to form a necessary length of film buffer, because the motor-reducing unit 279, synchronized with the motor 120 of the machine, revolves continuously, whereas the film 1 is conveyed in jerks by the carriage 96. This loop 282 is ballasted by a cylindrical sliding gear 283 placed at the summit of the latter and maintained laterally by collars 284 formed on either side of this sliding gear.

This device unwinds the film at a uniform speed and the tension of this film provided by the sliding gear 283 is also uniform. If the synchronization of the motor-reducing unit 279 is not strictly controlled or if there is an unexpected stoppage of the machine, there is a risk of the buffer loop 282 being much too large. It is consequently necessary to stop the motor-reducing unit when the loop reaches a given limit length. For this, a lever 285, pivotally mounted on a knife 286 integral with the cheeks 267 and balanced by means of a counterpoise 287, is placed at the middle part of the film. When thrust by the sliding gear 283, this lever tends to actuate a switch 288 mounted on one of the strutting tubes 268 so as to stop the feed of the motor-reducing unit 279. When the loop 282 diminishes in length, the sliding gear 283 rises and releases the lever which, under the action of its counterpoise 287, pivots on the knife 286 and no longer actuates the switch 288. The feed circuit of the motor-reducing unit 279 is closed and the film is again unwound: the loop 282 increases in length.

The flexible coupling 278 can be advantageously replaced by an electro-magnetic clutch controlled by the switch 288 so that the motor-reducing unit can be continuously fed.

FIGURE 7a shows an alternative embodiment of the adjustment of the eccentricity of the connecting rod 149 actuating the pump 143. The head 161 of this connecting rod is threaded on to a set of ball bearings traversed by a shouldered and threaded spindle 290. The threaded end of this spindle is screwed and locked in one of the holes 291 counter-sunk on a spiral made on a plate 292 keyed to the end of the shaft 119 of the motor 120. In selecting the hole 291 in which the spindle 290 is fixed, the eccentricity of the connecting rod 149 is checked, and hence its stroke and also the delivery of the pump.

Another form of embodiment of the device for driving the carriage 96 is shown in FIGURES 22 to 27. This device is mounted in an independent frame formed by two transversal plates 293 strutted by four tubes 294. The rings 97 fixed under the carriage 96 are threaded on to cylindrical guides 98 traversing the plates 293 and held on to the latter by pinned washers 98a. So as not to oppose the dilatation of the carriage, the guides 98 can be placed in lengthened slots made in the plates 293.

Two lugs 295 (FIGURES 22, 24 and 27) extended under the carriage are each traversed by the cylindrical stem 296 of a U-shaped section 297 cooperating with a flat plate 299 thrust by screws 300 to form a grip for a thin and wide belt 298 maintained between this flat plate and a plastic strip 301. Thus, the tightening of this end of each of the two belts 298 is uniformly distributed over the whole width. The free end of each of the two stems 296 is integral with a cup 302 surrounding a compression spring 303 threaded on to the rod and interposed between the lug 295 and the bottom of the cup 302. The corresponding lug 295 supports a crown 304 of elastic material such as rubber, forming a flexible abutment for the edge of the cup 302. It is quite obvious that each grip 297 can be provided with two cylindrical stems 296, when the width of the belt 298 is considerable, so as to afford a better longitudinal guiding.

Each of the opposed belts 298, which must be thin, can be made of plastic material, for example, of the superpolyamid family, such as that known in the trade under the name of "Rilsan" which has the advantage of being very flexible and very strong. These belts are passed over rollers 305 (FIGURES 24 and 25) and wound on shafts 306. Each roller 305 is supported by ball bearings 307 mounted in journals 308 extended on the corresponding plate 293, so that these rollers can revolve freely.

Each shaft 306 is provided with ball bearings 309 mounted in the vertical walls of a support 310 whose sole is fixed on a plate 311 rigidly connected to the lower strutted tubes 294 (FIGURES 24 and 25). Each shaft 306, at one of its ends, projects beyond the support 310 to enable the keying of a receiving pulley 312 on which a continuous belt 313 is wound driven by a driving pulley 314.

Two electric motors 315 (FIGURE 25), supported by plates 311, are connected by means of electro-magnetic clutches 316 to each of the driving pulleys 314. A cheek 317, integral with each plate 311, supports, on the one hand, the fixed part of the corresponding electro-magnetic clutch, and on the other, by means of ball bearings (not shown), the shaft of the motor 315 keyed on to the driving part of this clutch. A shaft 318, engaged in a U-shaped support 319, is keyed on to the receiving part of the clutch 316 and in a driving pulley 314. 320 designates two electrical control boxes of two independent motor units.

The carriage 96 is subjected, at the end of the outward travel and the end of the return travel, to the action of two dampers 321 and an electro-magnet 322 (FIGURE 22). The dampers are formed (FIGURE 26) by a base cylinder 323 and a floating piston 324 thrust by a spring 325 interposed between the bottom of this cylinder and one of the faces of this piston. The mass of air enclosed in this damper can be evacuated through a calibrated hole 326, drilled in the bottom of this cylinder, determining, in cooperation with the spring 325, the activating characteristic. This characteristic can be regulated by means of a needle screw mounted in the axis of the calibrated hole and able to vary the passage section of the air. This cylinder bottom is also provided with an inlet valve 327 whose delivery is adjustable. Each roller 323 is fixed, by means of its base, on one of the plates 293 and concentrically to a hole 328 drilled in the latter to allow the passage of an actuating rod 329. These rods (FIGURE 22) are secured in collars 330 and carried on the carriage 96 which enables the projecting length of the rod to be regulated.

Each electro-magnet 322 (FIGURE 24) is formed by a massive part 331 enveloping a coil 332 and so shaped as to have a base 333, for fixing on the corresponding plate 293, and a cylindrical guiding part 334 which communicates with the ambient air. A plunger core 335, extended under the carriage 96 opposite to each part 331, is prolonged by a nipple 336 intended to penetrate into the cylindrical guiding part 334.

As can be particularly seen in FIGURES 22 and 23, the upper strutting tube 294 in front, supports plates 337 on which balances 338 are fixed, longitudinally adjustable, intended to actuate contact units 339 extended under small plates 340 integral with the plates 293. The small plates 340 also support double switches 341 and their actuating fingers 342. The balance 338 and the finger 342 of the contact units 339 and 341, situated close to one of the plates 293, are placed on the pathway of a roller 343 mounted for revolving freely on a lug 344 extended under the carriage 96.

This device works in the following manner: the electric motors 315 revolve continuously because they are constantly fed. One of the electro-magnetic clutches 316 being energized, the corresponding electric motor 315 is coupled up to the driving pulley 314 which transmits the rotation to a receiving pulley 312, with or without reduction, according to the relative size of their diameters. The shaft 306 of the driven pulley 312 revolves, so that the corresponding belt 298 is wound on this shaft and pulls on the grip 297. The starting up of the carriage 96 in this direction occurs flexibly, for it is solely due to the reaction of the spring 303 compressed by the cup 302 pulled by the grip 297. The speed of the carriage reaches that of the belt 298 when the edge of the cup 302 is applied against the elastic crown 304 of this carriage.

The advance of the latter is accompanied by the unwinding of the other belt 298, this unwinding taking place flexibly by means of the corresponding spring 303 acting in the same manner.

One of the rollers 343 of the carriage 96 intercepts the corresponding balance 338 which actuates the contact unit 339. The latter cuts out the feed of the electro-magnetic clutch 316 and causes the energizing of the electromagnet 322 which sinks the plunger core 335, so that the carriage 96 continues to advance. As soon as the feed of the clutch is cut out, the rods 329 placed on this side of the carriage, come into contact with the floating pistons 324 of the dampers and drive in the latter against the action of the springs 325 and the enclosed air, so that these dampers cause a deceleration of the movement imparted to the carriage 96 by the belt 298. It may consequently be admitted that this carriage is driven by the belt during part of its travel and by the electromagnet during the end of this travel and that in the transition zone, the movement is made uniform, by opposition of the live power stored up of the braking power of the dampers.

When the roller intercepts the finger 342, the latter actuates the double switch 341 which causes, on the one hand, the cutting out of the feed of the electro-magnet 322 and the electro-magnetic clutch for the following phase of the cycle, and on the other, sets up the feed of the electro-magnetic clutch supported by the opposed plate 293. Thus, the second belt 298 drives the carriage 96 in reverse translation, which is possible, seeing that the preceding motive unit can no longer operate, even when the corresponding balance 338 and corresponding finger 342 are released.

It may be advantageous that the speeds of the outward travel and return travel of the carriage are different, as in the preceding example, and to obtain this effect, it is possible to act on the reduction ratio of the pulleys 312 and 314 and on the diameter of the shaft 306. Moreover, this driving device can be subject to the working of the other members of the machine or preceding chains or following this machine by any known means acting on these electro-magnetic clutches 316, for example.

Furthermore, the exit from this machine can be fitted with a meter actuated stroke by stroke by the fall of the packaged articles and this meter can comprise a maximum index which, when it is reached, cuts out the feed of the machine or only the electro-magnetic clutch.

Various modifications can also be applied to the forms of embodiment shown and described in detail, without going outside of the scope of the invention. In particular, most of the members forming the machine described only allow the packaging of articles of well defined dimensions. Adjustable members can be provided so that an entire range of articles of variable dimensions can be packaged by this machine. For example, the former 43 can be made up of rods provided with Teflon spheres at their ends, these rods being adjustable for length, position and slope. Likewise, the jaws 173 and 174 can be subject to a kinematic causing their symmetrical and synchronized displacement, which has the advantage of using relatively thick packaging films.

I claim:

1. In an automatic machine for packaging articles under thermoplastic film, said machine having a frame; a device for unwinding flat thermoplastic film, a device for shaping said film according to a tube, the section of said tube corresponding to the master frame of articles to be packaged, a stationary unit for the longitudinal sealing of said tube, a mechanism for the driving and periodical depositing of said articles in said tube, a runway for guiding said film and said tube, a cyclic motive mechanism driving said runway, said motive mechanism comprising a carriage slidably mounted on said frame of said machine, a plurality of thin belts each one of which, being wound on a shaft which is rotatably driven by a belt-and-pulley means, an electric motor, a pulley of said belt-and-pulley means being coupled to said motor, a solenoid-operated clutch controlling said motor, said clutch being synchronized with a solenoid the core of which being integral with said carriage, elastic buffer means connecting said motive mechanism and said belts, motion damping means on said carriage whereby said carriage may be driven, by cooperation of said motor and said solenoid, and a timed and synchronized combined transversal cutting and sealing device supported by said cyclic motive mechanism.

2. Machine according to claim 1, characterised in that said transversal cutting and sealing device supported by said motive mechanism comprises two jaws, at least one of which is mobile so as to pinch said thermoplastic tube for carrying it forward and releasing it to leave it motionless, during the return travel, one of said jaws supporting a resistance tape, traversed, at one instant of said motive mechanism cycle, by a current impulse controlled by a time-delay relay, the other jaw supporting a grooved ruler into which said resistance penetrates for rolling the sealing edges of said thermoplastic tube against the walls of the groove of said ruler.

3. Machine according to claim 1, said guiding runway for said film, shaped like an open corridor at the upper part thereof, supporting said film on which said articles for packaging are jointly arranged, said articles being spaced apart prior to the shaping of said tube by means of a separator comprising a solenoid operating, in synchronisation with the movement of said carriage, a plurality of needles releasing said articles.

4. Machine according to claim 1, said stationary longitudinal sealing unit comprising a nozzle containing a heating resistance traversed by air under pressure, said air emerging heated from the nozzle through an extended blower slot, said air under pressure being supplied from a tank filled by means of a diaphragm pump actuated by a connecting rod eccentrically mounted on the shaft of said electric motor driving said carriage.

5. Machine according to claim 1, said device for shaping said tube comprising a roller for equalizing the longitudinal tensions of said film, said roller supported by ball bearings mounted in the frame, and a tubular former of sheet steel bent conforming to the section of said master-frame of said articles, the edges of the upper wall of said former, cut in a bevel for converging towards the rear of the machine, being extended forward by wings bent downwards and rearwards.

6. Machine according to claim 1, said device for unwinding said flat film comprising a frame supporting a film spool, two smooth rollers loosely mounted on this frame, and a driving roller, one of said smooth rollers being opposed to said driving roller, said driving roller being connected by means of an electro-magnetic clutch with a continuously running ratio motor unit, said flat film passing between said driving roller and said corresponding smooth roller and over said second smooth roller, to form a loop inside of which is a sliding gear, for actuating in its low position an electric contact for stopping said electro-magnetic clutch.

References Cited in the file of this patent
UNITED STATES PATENTS

| 2,627,213 | Nye | Feb. 3, 1953 |
|---|---|---|
| 2,636,732 | Howard | Apr. 28, 1953 |
| 2,792,219 | Frank | Mar. 14, 1957 |
| 2,918,769 | Anderson et al. | Dec. 29, 1959 |